(12) United States Patent
Chen et al.

(10) Patent No.: US 11,095,080 B1
(45) Date of Patent: Aug. 17, 2021

(54) MULTIFUNCTIONAL POWER BOARD

(71) Applicant: Jiande Hunlee Electrical Appliance Co., Ltd., Zhejiang (CN)

(72) Inventors: Jianjun Chen, Zhejiang (CN); Huaqin Huang, Zhejiang (CN)

(73) Assignee: Jiande Hunlee Electrical Appliance Co., Ltd., Hangzhou (CN)

( * ) Notice: Subject to any disclaimer, the term of this patent is extended or adjusted under 35 U.S.C. 154(b) by 0 days.

(21) Appl. No.: 17/198,222

(22) Filed: Mar. 10, 2021

(30) Foreign Application Priority Data

Feb. 7, 2021 (CN) .......................... 202120365077.4

(51) Int. Cl.
| | |
|---|---|
| *H01R 25/00* | (2006.01) |
| *H01R 13/72* | (2006.01) |
| *H01R 27/00* | (2006.01) |
| *H01R 13/518* | (2006.01) |
| *H01R 24/60* | (2011.01) |
| *H01R 13/717* | (2006.01) |
| *H01R 13/713* | (2006.01) |
| *H02G 11/02* | (2006.01) |
| *H01R 13/66* | (2006.01) |

(52) U.S. Cl.
CPC ......... *H01R 25/006* (2013.01); *H01R 13/518* (2013.01); *H01R 13/72* (2013.01); *H01R 27/00* (2013.01); *H01R 13/6666* (2013.01); *H01R 13/713* (2013.01); *H01R 13/717* (2013.01); *H01R 24/60* (2013.01); *H02G 11/02* (2013.01)

(58) Field of Classification Search
CPC .... H01R 13/518; H01R 13/72; H01R 13/713; H01R 13/717; H01R 24/60; H01R 13/27; H01R 25/006; H01R 13/6666; H02G 11/02
See application file for complete search history.

(56) References Cited

U.S. PATENT DOCUMENTS

| | | | |
|---|---|---|---|
| 7,112,097 B1 * | 9/2006 | Lam ..................... | H01R 25/003 439/654 |
| 10,594,096 B2 * | 3/2020 | Rahner ................ | H01R 25/006 |
| 2007/0275594 A1 * | 11/2007 | Greenberg ............. | H01R 27/02 439/501 |
| 2011/0215957 A1 * | 9/2011 | Hummerston .......... | H03M 1/12 341/155 |
| 2012/0320546 A1 * | 12/2012 | Wu ........................ | H02G 11/02 361/755 |
| 2020/0388972 A1 * | 12/2020 | Byrne .................. | H01R 13/665 |

* cited by examiner

*Primary Examiner* — Briggitte R. Hammond

(57) ABSTRACT

A multifunctional power board includes a housing, a power supply assembly and a data line assembly arranged in the housing, the housing includes a base and a convex connecting portion connected to the base, the connecting portion is provided with a plurality of sockets spaced apart, the data line assembly includes a data line and a winding mechanism, one end of the data line is wound on the winding mechanism, and the other end of the data line is exposed to the exterior of the housing, the power supply assembly includes a power cord and a wiring base, the socket, the data line and the power cord are all electrically connected to the wiring base. Both the data line assembly and the socket are powered by the wiring base.

8 Claims, 6 Drawing Sheets

A

MULTIFUNCTIONAL POWER BOARD

CROSS-REFERENCE TO RELATED APPLICATION

The present application is based on and claims the priority benefits of China application No. 202120365077.4, filed on Feb. 7, 2021. The entirety of the above-mentioned patent application is hereby incorporated by reference herein and made a part of this specification.

BACKGROUND

Technical Field

This application relates to the field of household appliances, and more particularly, to a multifunctional power board.

Description of Related Art

A power board is a common household appliance, used for bedrooms, living rooms, kitchens, and the like. The power board, formally named as an extension cord assembly or a trailing socket, can be connected by more than one power plug, so that both the space and wires are saved.

In the related technology of the power board, the most common power board is a power strip, i.e., a plurality of sockets are arranged on one plane and can be simultaneously connected with plugs of a plurality of electric appliances, thereby achieving the function of increasing the number of connectable electrical appliances and shortening the distance between the electrical appliances.

However, in the related art, when a power board is plugged with a plurality of larger plugs (especially some plugs with irregular shapes), the positions of adjacent sockets are easily interfered, so that the adjacent sockets cannot be used.

Therefore, there remains a need in the art for a multifunctional power board capable of sufficiently utilizing jacks and reducing mutual interference.

SUMMARY

In order to improve the convenience of the power board for use, the multifunctional power board provided by in a first aspect of the present application adopts the following technical solutions:

A multifunctional power board, including a housing, a power supply assembly and a data line assembly arranged in the housing, wherein the housing includes a base and a convex connecting portion connected to the base, the connecting portion is provided with a plurality of sockets spaced apart, the data line assembly includes a data line and a winding mechanism, one end of the data line is wound on the winding mechanism, and the other end of the data line is exposed to the exterior of the housing, the power supply assembly includes a power cord and a wiring base, the socket, the data line and the power cord are all electrically connected to the wiring base.

By adopting the technical solution, when the power board is in use, it is connected to an external power supply via the power cord, and is electrically connected to the wiring base, by which both the data line assembly and the socket are powered by the wiring base. Through the spherical surface arrangement of the connecting portion of the housing, sockets on the power board can be connected from the periphery of the power board by a user, and due to the spherical surface arrangement of the connecting portion, plugs connected to the adjacent sockets are arranged at an angle, interference is less likely to occur, and therefore reasonable use of the sockets on the power board is facilitated. Through the arrangement of the winding mechanism, when the data line is not in use, the data line can be wound and received through the winding mechanism.

Preferably, the connecting portion has a hemispheroid or polygon frustum shape.

By providing the connecting portion with a convex hemispheroid or polygon frustum shape, the sockets provided thereon can be spatially distributed, thereby making plugs to be inserted more conveniently, and avoiding interference between adjacent sockets.

Preferably, the connecting portion is provided with at least one USB interface and at least one Type-C interface, and the USB interface and the Type-C interface are all electrically connected to the wiring base.

By adopting the technical solution, the USB interface and the Type-C interface are arranged on the connecting portion, so that the functionality of the power board is improved.

Preferably, a connecting plane is provided at one end of the connecting portion away from the base, the USB interface and the Type-C interface are all arranged on the connecting plane, and all arranged in the circumferential direction of the connecting plane.

By adopting the technical solution, the USB interface and the Type-C interface are arranged on the connection plane at the upper end of the connecting portion, the USB interface and the Type-C interface are separated from the socket, thereby reducing the probability of interference between the plugs on the socket, and through the circumferential arrangement, the user can conveniently use the required interface from all directions.

Preferably, the USB interface and the Type-C interface are arranged alternately.

By adopting the technical solution, the USB interface and the Type-C interface are arranged alternately, so that the USB interface and the Type-C interface can be distributed uniformly.

Preferably, the connecting plane is provided with an illumination lamp strip, which is electrically connected to the wiring base.

By adopting the technical solution, the arrangement of the illumination lamp strip facilitates a user to quickly find a desired interface in a dim environment.

Preferably, an overcurrent protector is electrically connected between the power cord and the wiring base.

By adopting the technical solution, the arrangement of the overcurrent protector can effectively protect safety of the circuit in the power board.

Preferably, the winding mechanism includes a take-up reel and a limiting assembly rotatably connected to the base, a reset member for driving the take-up reel to reset by rotating back is provided between the base and the take-up reel, a winding groove is formed in the take-up reel in the circumferential direction of the take-up reel, for receiving the data line; the limiting assembly includes a ratchet coaxial with the take-up reel and a pawl snap connected to the ratchet, the ratchet and the take-up reel are connected through a connecting shaft, the connecting shaft is fixedly connected to the take-up reel and rotatably connected to the ratchet, one side of the ratchet toward the connecting shaft is formed coaxially with a limiting groove, a limiting member is provided in the limiting groove, the connecting shaft is arranged in the limiting groove and in clearance fit with the limiting groove, and the connecting shaft is provided with an elastic member abutting against the limiting member.

By adopting the technical solution, the take-up reel is driven by the reset member to rotate back, so as to wind the data line in the housing. When the data line is unwound from the take-up reel, the take-up reel is circumferentially limited by the limiting member and the elastic member, the take-up reel drives the ratchet to rotate, the tendency of the take-up reel to reset by rotating back is blocked by the pawl, so that the data line can be positioned freely. After the use of the data line, the data line is further pulled outwards and suddenly released, whereby the elastic member is elastically deformed due to an excessively large stress applied by the reset member to disengage from the limiting of the limiting member and rotate back by one circle, so that the data line is wound and the elastic member is snap connected to the reset member again, achieving free positioning of the data line and improving the convenience for using the data line.

Preferably, the connecting portion is formed with a connecting port, and the socket is snap connected to the connecting port.

By adopting the technical solution, the socket is snap connected to the connecting port, thereby facilitating the mounting of the socket.

In summary, the present application includes at least one of the following beneficial technical effects:
1. The providing of the spherical surface housing effectively prevents mutual interference between the plugs connected to the power board;
2. The providing of the winding mechanism enables the data line to be freely extendable in use and be wound up when not in use, thereby improving the convenience for use.

DESCRIPTION OF THE EMBODIMENTS

This application is described in detail below in combination with FIGS. 1-6.

Embodiment 1

Figure 1:
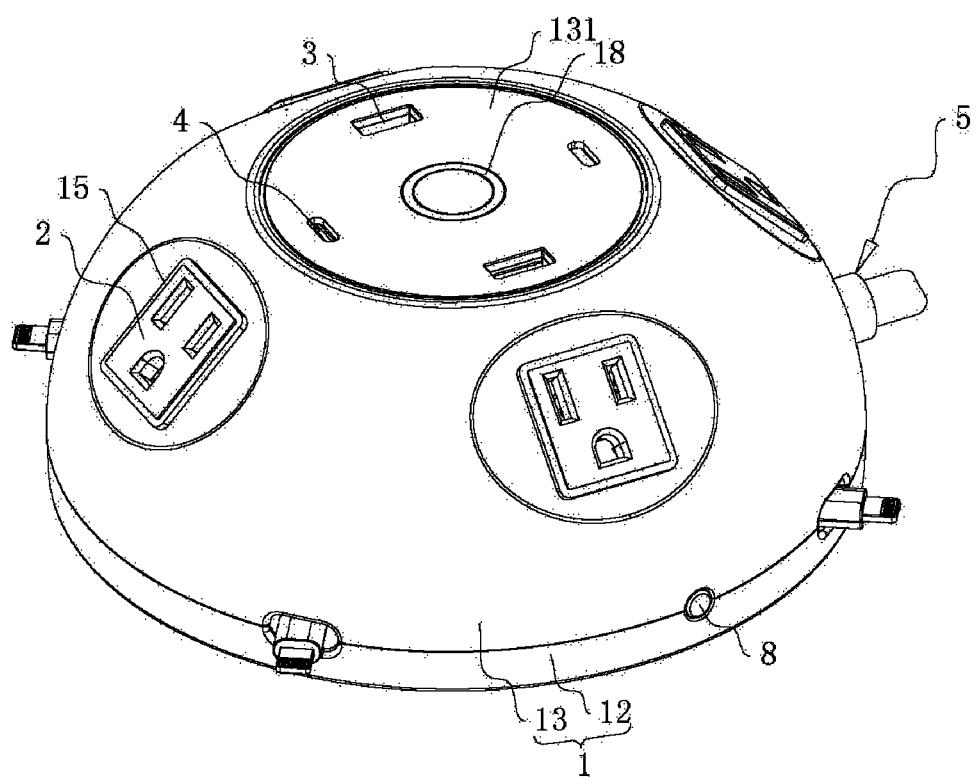
FIG. 1 is an overall schematic structural diagram of a multifunctional power board according to Embodiment 1 of the present application.
Figure 2:
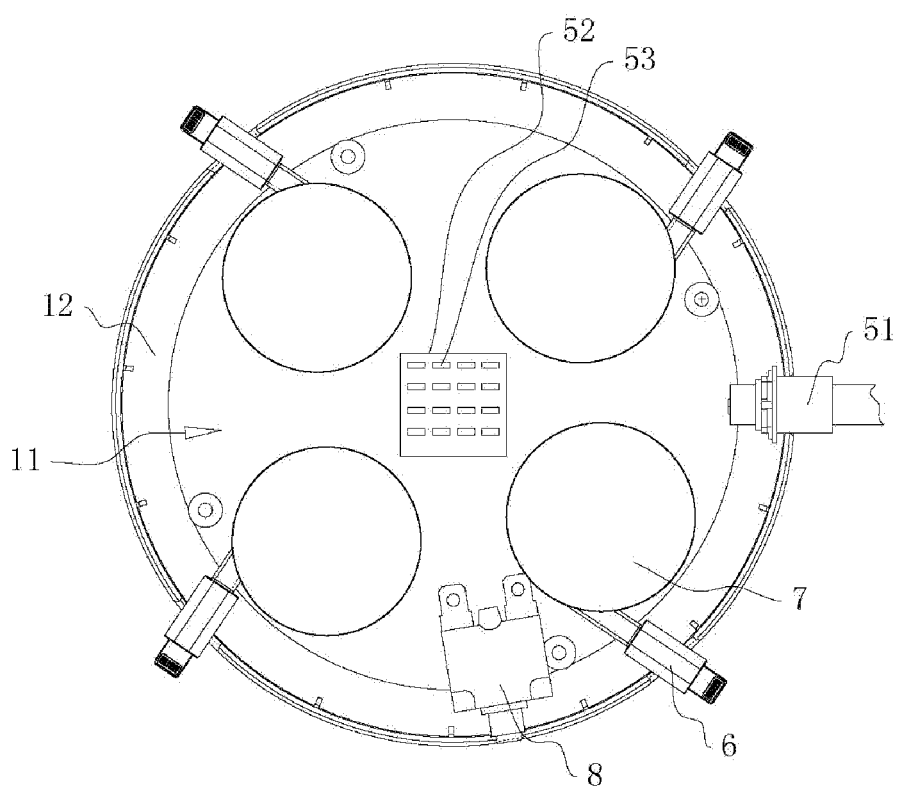
FIG. 2 is a top view of a housing according to Embodiment 1 of the present application, as seen from the interior.

Embodiments of the present application provide a multifunctional power board. Referring to FIGS. 1 and 2, the power board includes a housing 1, a socket 2 arranged in the housing 1, a USB interface 3 and a Type-C interface 4 arranged on the housing 1, a USB interface 3 and a Type-C interface 4 arranged in the housing 1, a power supply assembly 5 and a data line assembly arranged in the housing 1, and an overcurrent protector 8. The housing 1 is hollow and forms a mounting cavity 11, the socket 2, the USB interface 3, the Type-C interface 4 and the data line assembly are all arranged within the mounting cavity 11 and electrically connected to the power supply assembly 5, and the overcurrent protector 8 is connected in series to the power supply assembly 5.

When the power supply assembly 5 is electrically connected to the power supply, the socket 2, the USB interface 3, the Type-C interface 4, and the data line assembly arranged on the housing 1 are all powered on, and a user can connect the electrical appliance to the corresponding position for direct use.

Referring to FIG. 1, the housing 1 includes a base 12 and a convex connection portion 13 connected to the base 12. In some embodiments, the connecting portion 13 is configured to have a hemispheroid or polygon frustum shape. A plurality of bolts are threaded at the bottom of the base 12 in the circumferential direction of the base 12. The connecting portion 13 is integrally formed with a plurality of connecting posts at corresponding positions toward one side of the base 12. An internal threaded hole is formed at one end of each connecting post toward the bolt, and the bolts are in threaded connection with the connecting post, so that the base 12 and the connecting portion 13 are detachably connected.

One end of the connecting portion 13 away from the base 12 is spherical, so that the connecting portion 13 and the base 12 have a hemispheroid shape when connected as a whole. In other embodiments, one end of the connecting portion 13 away from the base 12 also can have a polygon frustum shape, such as quadrangular frustum shape, pentagonal frustum shape, or the like.

Referring to FIG. 1, the connecting portion 13 is provided with a plurality of sockets 2, and the sockets 2 are all fixed to the connecting portion 13, for example, snap connected to the connecting portion 13. In an embodiment, four sockets 2 are provided, and the four sockets 2 are circumferentially arranged on the connecting portion 13 along the sidewall of the connecting portion 13 at equal distances.

Figure 3:
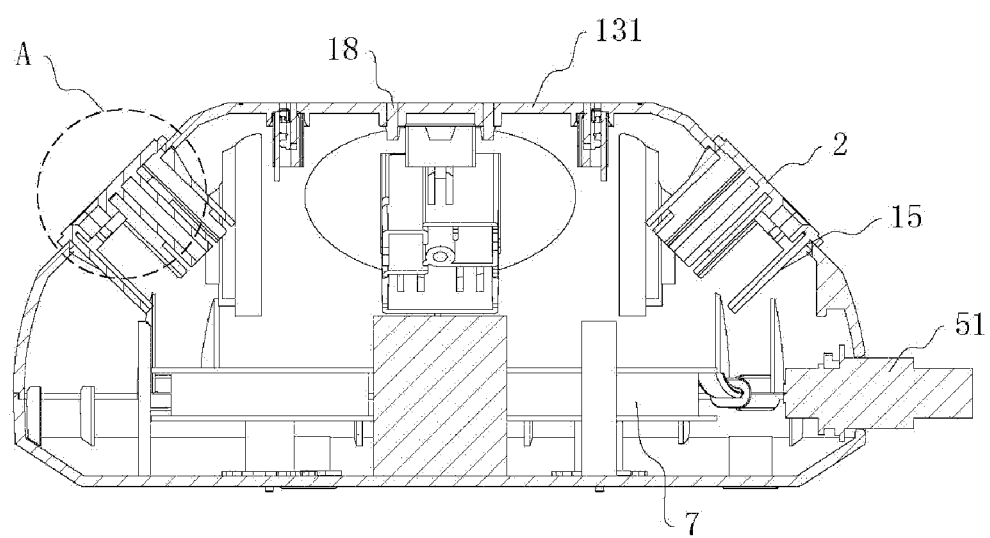
FIG. 3 is a side cross-sectional view of a multifunctional power board according to Embodiment 1 of the present application.

Referring to FIGS. 1 and 3, the connecting portion 13 is formed with a connecting port 15. Two connecting ports 15 are arranged at two sides of the socket 2, and provided with a first snap connection structure and a second snap connection structure.

Figure 4:
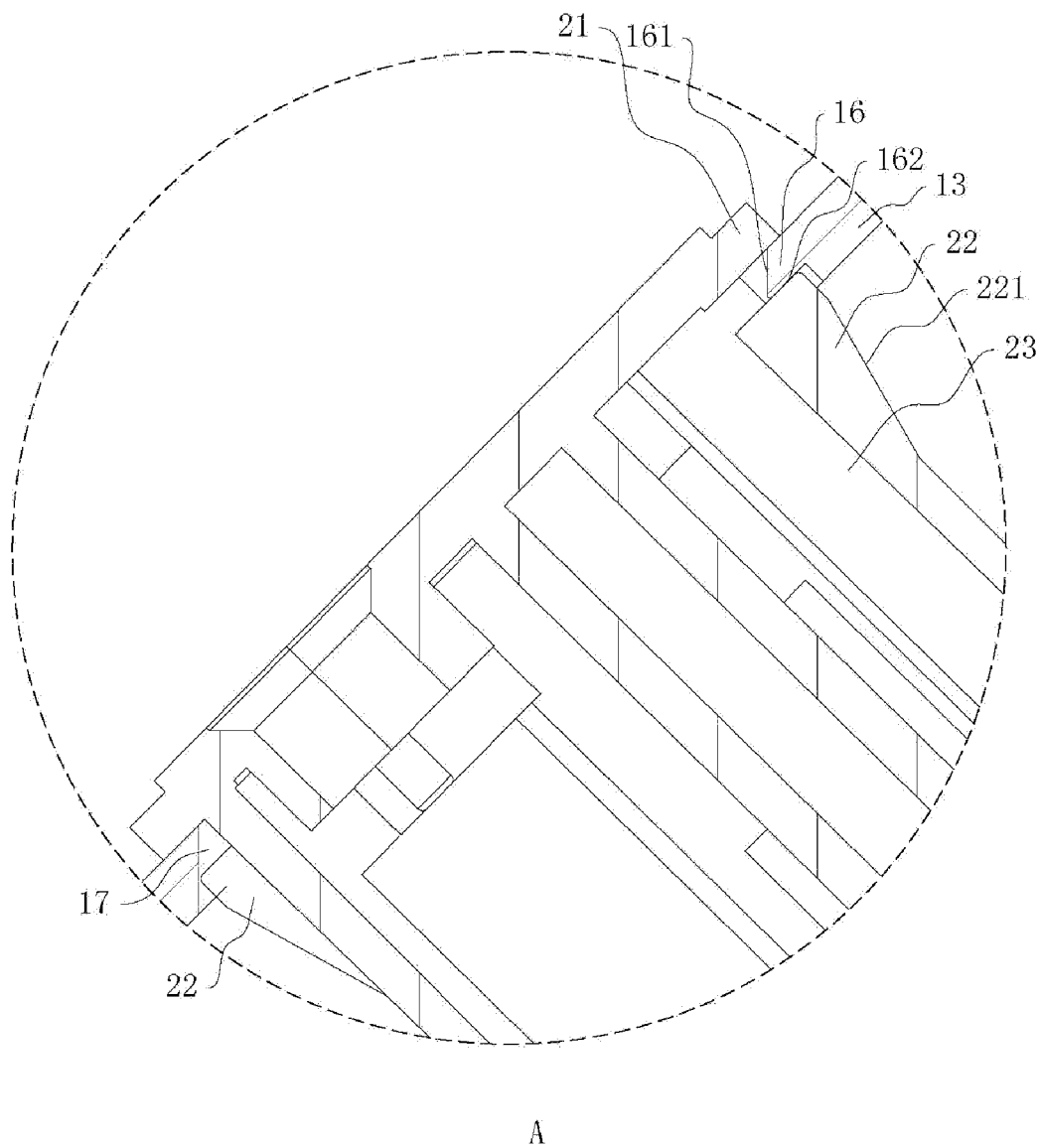
FIG. 4 is a partial enlarged schematic diagram of Portion A in FIG. 3.

Referring to FIG. 4, the socket 2 is integrally formed with a limiting convex ring 21 in the circumferential direction, and the limiting convex ring 21 abuts on the exterior of the connecting portion 13. The two sides of the socket 2 are provided with snap-in members 22 used for cooperating with the first snap connection structure and the second snap connection structure. The socket 2 is formed with deformable grooves 23 at three sides of the snap-in members 22, so that the snap-in member 22 can be elastically bent and deformed into the interior of the socket 2 through the deformable groove 23. The snap-in member 22 forms a first guide surface 221 inclined inwardly toward the interior of the housing 1, at one side toward the inner wall of the connecting port 15.

The first snap connection structure is a snap connection bump 16 integrally formed on the inner wall of the connecting port 15. The vertical cross-section of the snap connection bump 16 is triangular, so that the snap connection bump 16 forms a second guide surface 161 inclined downwardly toward the interior of the connecting port 15, at a side facing the exterior of the housing 1. The snap connection bump 16 forms an abutment surface 162 on the side toward the interior of the housing 1 and forms an inserting slot with the inner wall of the connecting portion 13. The number of snap-in members 22 arranged at one side of the socket 2 toward the first snap connection structure is one.

When the socket 2 slides into the connecting port 15, the second guide surface 161 abuts against the first guide surface 221, and pushes the snap-in member 22 to bend and deform into the socket 2. After the snap-in member smoothly passes through the snap connection bump 16, the snap-in member 22 is restored and positioned in the inserting slot, with the end of the snap-in member 22 facing the exterior of the housing 1 abutting against the abutting surface 162 of the snap connection bump 16, in other words, the snap-in member 22 is limited by the snap connection bump 16.

The second snap connection structure is a snap groove 17 formed on the inner wall of the connecting port 15, the bottom of the snap groove 17 is inclined towards the interior of the connecting port 15 facing the exterior of the housing 1, and the number of snap-in members 22 arranged on the side of the socket 2 facing the second snap connection structure is two. When the socket 2 slides into the connecting port 15, the snap-in member 22 first abuts against the inner wall of the connecting port 15, and the snap-in member 22 is elastically bent and deformed itself into the socket 2 under the guidance of the first guide surface 221 of the snap-in member 22, and is then restored and snapped into the snap groove 17.

Referring to FIGS. 1 and 3, a connecting plane 131 is provided at one end of the connecting portion 13 away from the base 12, a plurality of USB interfaces 3 and the Type-C interfaces 4 are all arranged on the connecting plane 131. There are at least one of the USB interface 3 and at least one of the Type-C interface 4, for example, in one embodiment, there are two USB interfaces 3 and two Type-C interfaces 4. The two USB interfaces 3 and the two Type-C interfaces 4 are circumferentially arranged on the connecting plane 131 at equal distances, and the USB interface 3 and the Type-C interface 4 are arranged alternately, so that the user can conveniently connect the required interface from all directions.

The connection plane 131 is provided with an illumination lamp strip 18. The illumination lamp strip 18 is annular and arranged at the center of the connection plane 131, so that the two USB interfaces 3 and the two Type-C interfaces 4 are arranged in the outer circumferential direction of the illumination lamp strip 18, thereby facilitating a user to quickly find a desired interface in a dim environment.

Referring to FIG. 2, several groups of data line assemblies are arranged circumferentially along base 12, for example, in one embodiment, four groups of data line assemblies are arranged, in which the data line assembly includes a data line 6 and a winding mechanism 7. One end of the data line 6 is wound in the winding mechanism 7, and the other end of the data line 6 is exposed to the exterior of the housing 1.

The winding mechanism 7 can be a conventional winding mechanism, and can directly use a Pengteng single-pull reel, and the reel can achieve the effect of winding and unwinding the data line 6. The data line 6 is wound on the reel and electrically connected to the reel. The reel is electrically connected to a power supply assembly 5. When the data line 6 is in use, the data line 6 is pulled outwards, and unwound from the winding mechanism 7.

Referring to FIG. 2, the power supply assembly 5 includes a power cord 51 and a wiring base 52. The power cord 51 is used for connecting an external power supply and an overcurrent protector 8. The overcurrent protector 8 is electrically connected to the wiring base 52. A plurality of electrical connectors 53 are formed on the wiring base 52. Each socket 2, a conductive sheet 712 of each take-up reel 71, each USB interface 3, each Type-C interface 4 and each illumination lamp strip 18 are electrically connected to an electrical connector 53, respectively.

The implementation principle of an embodiment of the present application is that:

When in use, the power cord 51 introduces the external power supply into the housing 1, and protects safety of the circuit via the overcurrent protector 8, and then electrically connected to all the interfaces and the illumination lamp strip 18 via the wiring base 52. The user connects the electrical appliance to be connected to the corresponding interface for direct use. When the corresponding data line 6 is used, the data line 6 is pulled outwards.

Embodiment 2

Figure 5:
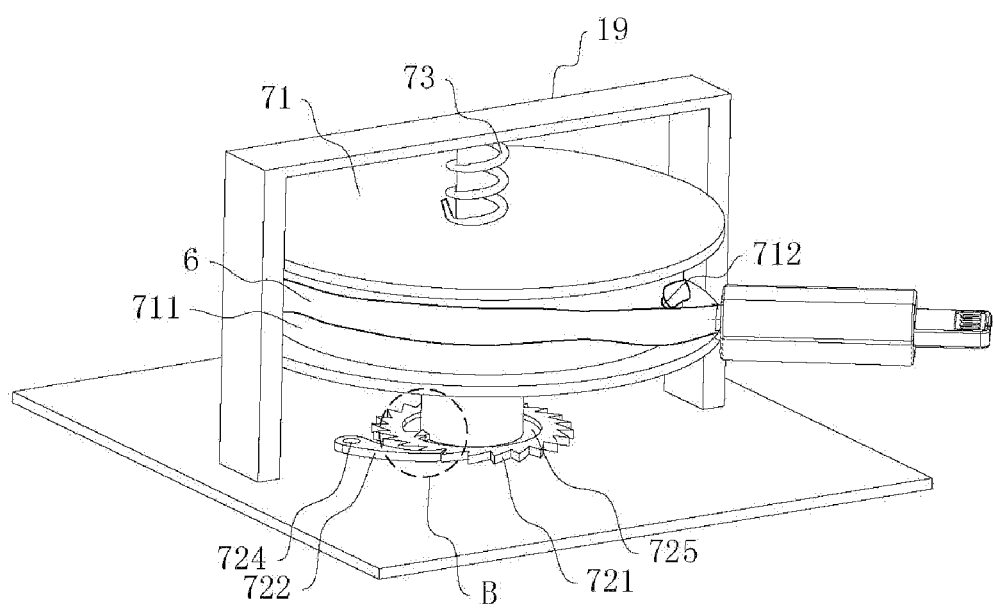
FIG. 5 is a schematic structural diagram of a winding mechanism according to Embodiment 2 of the present application.

Compared to Embodiment 1, the difference lies in that:

Referring to FIG. 5, the winding mechanism 7 includes a take-up reel 71, a limiting assembly 72 for limiting the take-up reel 71, and a reset member 73 for driving the take-up reel 71 to reset by rotating back.

A winding groove 711 is formed in the take-up reel 71 in the circumferential direction of the take-up reel 71, and is provided with a conductive sheet 712 at the groove bottom, which is electrically connected to the power supply assembly 5. One end of the data line 6 is fixedly connected to the winding groove 711 and electrically connected to the power supply assembly 5 through the conductive sheet 712.

The limiting assembly 72 includes a ratchet 721 and a pawl 722 for mating with the ratchet 721.

The ratchet 721 is rotatably connected to the base 12, the pawl 722 is rotatably connected to the base 12 via a second rotating shaft 724 and driven against the ratchet 721 by a torsion spring (not shown). The pawl 722 is arranged on one side of the ratchet 721 and is snap connected to the ratchet 721.

Figure 6:
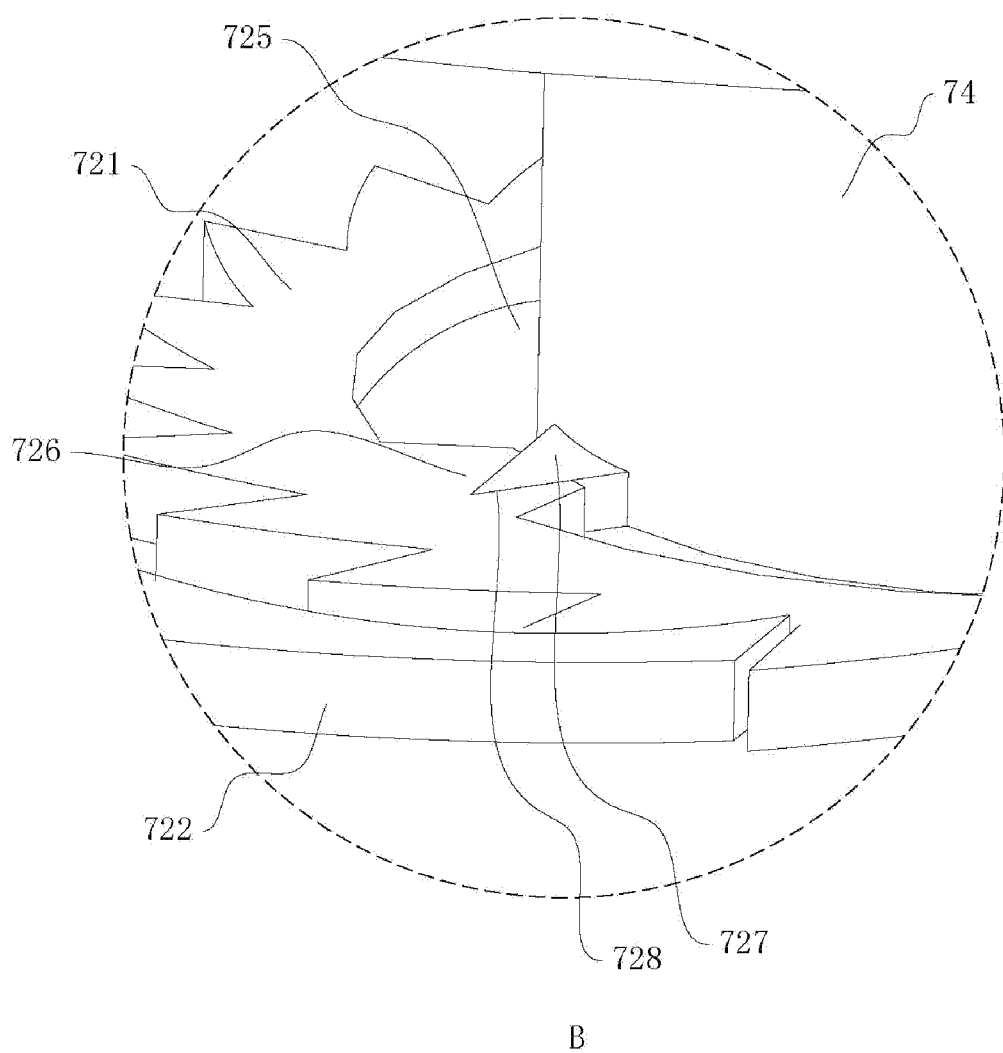
FIG. 6 is a partial enlarged view of Portion B in FIG. 5.

Referring to FIG. 6, the take-up reel 71 is rotatably connected to the ratchet 721 via a connecting shaft 74. One end of the connecting shaft 74 is coaxially fixedly connected to the take-up reel 71, and the other end is rotatably connected to the ratchet 721 via a bearing. A limiting groove 725 is coaxially formed at one end of the ratchet 721 towards the take-up reel 71, and the connecting shaft 74 is in clearance fit with the limiting groove 725, and a limiting member 726 and an elastic member 727 are arranged in the gap between the connecting shaft 74 and the inner wall of the limiting groove 725.

The limiting member 726 is integrally formed in the ratchet 721 and protrudes from the limiting groove 725, and the limiting member 726 is also in clearance fit with the connecting shaft 74 for allowing the elastic member 727 to passthrough after elastically deformed. A snap groove 728 is formed in the middle position of the limiting member 726. The elastic member 727 is radially arranged along the connecting shaft 74 and is snapped in the snap groove 728 so that the connecting shaft 74 and the ratchet 721 are circumferentially limited. The elastic member 727 may be a block structure made of a rubber block or other elastically deformable material. The horizontal cross-sections of the elastic member 727 and the snap groove 728 are both right-angled triangles. When the take-up reel 71 is in the unwinding rotation, the right-angled edge of the elastic member 727 abuts against the right-angled edge of the snap groove 728. When the take-up reel 71 has a tendency to take up, the beveled edge of the elastic member 727 abuts against the beveled edge of the snap groove 728. When the take-up reel 71 is unwound, the elastic member 727 stably pushes the ratchet 721 to rotate and cannot easily deform. When the take-up reel 71 has a tendency to take up, the guiding of the elastic member 727 and the beveled edge of the snap groove 728 facilitates the elastic member 727 to deform and pass therethrough.

When the data line 6 is unwound from the take-up reel 71, the elastic member 727 abuts against the limiting member 726 and pushes the ratchet 721 to rotate synchronously with the connecting shaft 74, so that the ratchet 721 and the take-up reel 71 are in a synchronous rotating state. When the take-up reel 71 is unwinding, the reset member 73 tends to be stressed and tightened, the ratchet 721 pushes the pawl 722 to rotate to allow the pawl 722 pass therethrough by rotating, and when the data line 6 is loosened, the reset member 73 drives the take-up reel 71 to tend to reset by rotating back, and the pawl 722 is snap connected to the ratchet 721 and prevents the ratchet 721 from being reset and rotated back. In this way, when a user loosens the data line 6 by pulling out a desired length of the data line 6, the take-up reel 71 is positioned through cooperation of the ratchet 721 and the pawl 722, so that the data line 6 cannot be wound back but keep the current length exposed outside the housing 1.

When the data line 6 continues to be pulled outwards and unwound to a certain length from the take-up reel 71, a relatively large rotation force is applied to the connecting shaft 74 by the reset member 73, and the elastic member 727 is subjected to a large compression force and elastically deformed to an extent by which it can get out of the limiting of the limiting member. Thereby, the elastic member 727 rotates by itself for one circle, so that the connecting shaft 74 drives the take-up reel 71 to reset by rotating, and the take-up reel 71 completes winding of the data line 6. After the connecting shaft 74 rotates by itself for one circle, the elastic member 727 is driven to deform due to inertia and then is snapped into the snap groove 728 again, ready for next use.

Referring to FIG. 5, the reset member 73 is a torsion spring, and the base 12 is fixedly provided with a mounting base 19 for mounting the take-up reel 71. One end of the connecting shaft 74 away from the ratchet 721 is rotatably connected to the mounting base 19, and the torsion spring is sleeved on the connecting shaft 74, with two ends being respectively fixedly connected to the take-up reel 71 and the mounting base 19.

The implementation principle of an embodiment of the present application is that:

When a user does not use the data line 6, the data line 6 is wound on the take-up reel 71 and arranged in the housing 1. When the data line 6 is in use, the data line 6 is pulled outwards to a certain required length and the take-up reel 71 is limited by the limiting assembly 72, so that the data line 6 keeps the current length extending out of the housing 1. After the use of the data line 6, the data line 6 is further pulled outwards and suddenly released, whereby the limiting member 72 is disengaged due to overlarge stress to release the limitation on the take-up reel 71, and the reset member 73 drives the take-up reel 71 to reset by rotating back while winding the data line 6, so as to achieve the free positioning of the data line 6.

The above description is only preferred embodiments of the present application and is not intended to limit the protection scope of the present application. Therefore, all equivalent changes of the structure, shape or principle according to the spirit of the present application should be all included in the protection scope of the present application.

What is claimed is:

1. A multifunctional power board, comprising a housing, a power supply assembly and a data line assembly arranged in the housing, wherein the housing comprises a base and a convex connecting portion connected to the base, the connecting portion is provided with a plurality of sockets spaced apart, the data line assembly comprises a data line and a winding mechanism, one end of the data line is wound on the winding mechanism, the other end of the data line is exposed to the exterior of the housing, the power supply assembly comprises a power cord and a wiring base, and the socket, the data line and the power cord are all electrically connected to the wiring base, wherein the winding mechanism comprises a take-up reel and a limiting assembly rotatably connected to the base, a reset member for driving the take-up reel to reset by rotating back is provided between the base and the take-up reel, and a winding groove is formed in the take-up reel in the circumferential direction of the take-up reel for receiving the data line; the limiting assembly comprises a ratchet coaxial with the take-up reel and a pawl snap connected to the ratchet, the ratchet and the take-up reel are connected through a connecting shaft, the connecting shaft is fixedly connected to the take-up reel and rotatably connected to the ratchet, one side of the ratchet toward the connecting shaft is formed coaxially with a limiting groove, a limiting member is provided in the limiting groove, the connecting shaft is arranged in the limiting groove and in clearance fit with the limiting groove, and the connecting shaft is provided with an elastic member abutting against the limiting member.

2. The multifunctional power board according to claim 1, wherein the connecting portion has a hemispheroid or polygon frustum shape.

3. The multifunctional power board according to claim 1, wherein the connecting portion is provided with at least one USB interface and at least one Type-C interface, and the USB interface and the Type-C interface are all electrically connected to the wiring base.

4. The multifunctional power board according to claim 3, wherein a connecting plane is provided at one end of the connecting portion away from the base, the USB interface and the Type-C interface are all arranged on the connecting plane, and all arranged in the circumferential direction of the connecting plane.

5. The multifunctional power board according to claim 4, wherein the USB interface and the Type-C interface are arranged alternately.

6. The multifunctional power board according to claim 4, wherein the connecting plane is provided with an illumination lamp strip, and the illumination lamp strip is electrically connected to the wiring base.

7. The multifunctional power board according to claim 1, wherein an overcurrent protector is electrically connected between the power cord and the wiring base.

8. The multifunctional power board according to claim 1, wherein the connecting portion is formed with a connecting port, and the socket is snap connected to the connecting port.

* * * * *